United States Patent [19]

Notomi et al.

[11] 3,985,849

[45] Oct. 12, 1976

[54] PREPARATION OF BIAXIALLY ORIENTED POLYVINYL ALCOHOL FILM

[75] Inventors: Ryohta Notomi; Tuyoshi Shigeyoshi; Masayoshi Sugiyama, all of Fuji, Japan

[73] Assignee: Kohjin Co., Ltd., Tokyo, Japan

[22] Filed: Nov. 8, 1974

[21] Appl. No.: 522,279

[30] Foreign Application Priority Data

Nov. 26, 1973  Japan............................. 48-131735

[52] U.S. Cl................................ 264/95; 264/185; 264/210 R; 264/211; 264/235; 264/290 R; 264/345

[51] Int. Cl.²...................... B29D 7/24; D01D 5/12; D01F 6/14

[58] Field of Search................. 264/95, 209, 210 R, 264/289, 290 R, 185, 211, 235, 345, 89, 216

[56] References Cited
UNITED STATES PATENTS

| | | | |
|---|---|---|---|
| 3,243,486 | 3/1966 | Pilaro.................................. | 264/209 |
| 3,425,979 | 2/1969 | Monaghan et al..................... | 264/95 |
| 3,440,316 | 4/1969 | Miyake et al........................ | 264/185 |
| 3,607,812 | 9/1971 | Takigawa et al...................... | 264/95 |
| 3,723,583 | 3/1973 | Hovermale et al. ................. | 264/289 |
| 3,872,196 | 3/1975 | Bridgeford........................... | 264/185 |

Primary Examiner—Jeffery R. Thurlow
Attorney, Agent, or Firm—Armstrong, Nikaido & Wegner

[57] ABSTRACT

Method for preparing a biaxially oriented polyvinyl alcohol film by extruding a mixture of polyvinyl alcohol and water, and if desired, incorporated with a polyhydric alcohol, in a tubular form, drying the tubular film to give a tubular non-stretched film having a degree of crystallization of not more than 44 % and a water content of not more than 20 % by weight, and biaxially stretching the non-stretched film at a stretching ratio of not less than 2 in each of the machine and transverse directions by means of inflation under conditions such that the film surface at the starting point of stretching is maintained at a temperature in the range from about 60° to about 150°C., the surface of the film reaching a maximum temperature at the middle portion of a stretching zone extending from said starting point to a point where the tube reaches a maximum diameter and the difference between maximum and minimum surface temperatures in the stretching zone does not vary more than about 15°C. The prepared biaxially oriented film is excellent in tensile strength, dimensional stability and impact resistance at low temperature, and has a tensile strength of not less than 1,200 Kg./cm.², an elongation of 30 % to 80 % and a Young's modulus of not less than 10,000 kg./cm.².

6 Claims, 4 Drawing Figures

U.S. Patent  Oct 12, 1976  3,985,849
FIG.1
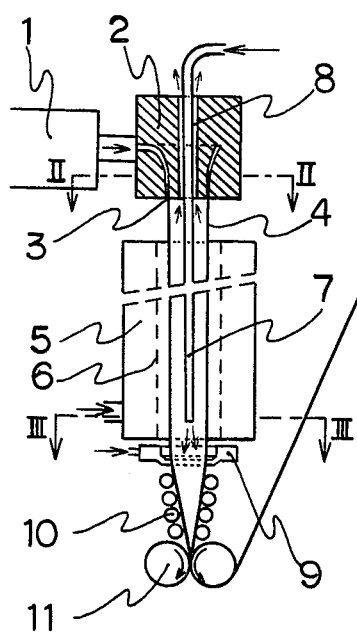
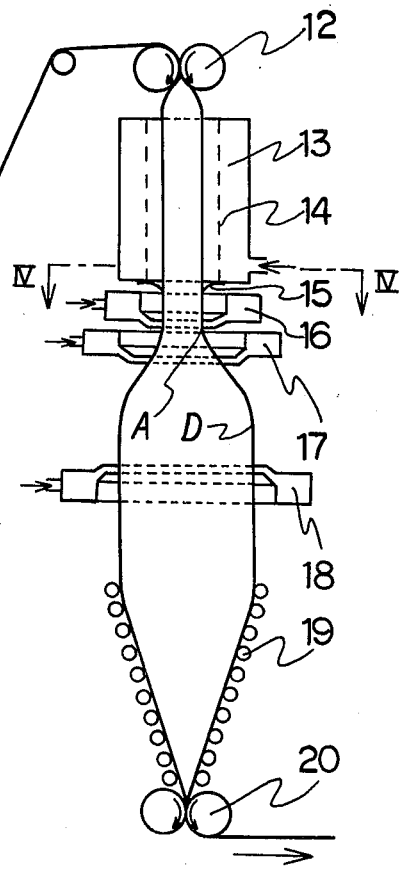
FIG.2  FIG.3  FIG.4
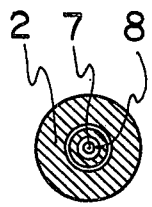
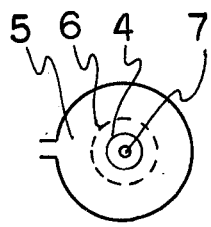
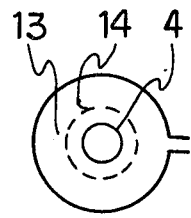

PREPARATION OF BIAXIALLY ORIENTED POLYVINYL ALCOHOL FILM

BACKGROUND OF THE INVENTION

The present invention relates to a preparation of polyvinyl alcohol film, and more particularly to a method for preparing a biaxially oriented polyvinyl alcohol film having excellent tensile strength, impact strength and dimensional stability in which simultaneous biaxial stretching is effected by means of inflating an extruded tubing of the polymer.

It is well known that a polyvinyl alcohol film is excellent in transparency, toughness, flexibility, including anti-fogging and anti-static properties, and hitherto, a non-stretched polyvinyl alcohol film has been widely employed in various uses including wrapping materials. Also, it is expected that the demand for the film will further increase in place of a plasticized polyvinyl chloride film which causes serious problems in hygienic and incineration treatment, since the polyvinyl alcohol film does not generate chlorine or hydrochloric acid when burned.

However, a non-stretched polyvinyl alcohol film is poor in impact resistance, and is especially fragile at low temperature, unless a polyhydric alcohol such as glycerin, diethylene glycol, dipropylene glycol or sorbitol, or urea is added thereto as a plasticizer in comparatively large quantities, for instance, in an amount of 10 to 15 % by weight per polyvinyl alcohol. Therefore, since such a plasticizer is incorporated into a non-stretched polyvinyl alcohol film in comparatively large quantities in practical use, such a non-stretched film has the disadvantage that not only is the dimensional stability poor but printed adjacent colors appear out of register during the printing process due to film elongation at the time of converting to secondary products such as printing or bag making, and also the anti-blocking or slipability properties of the film are poor due to bleeding of the plasticizer.

In the case of a polyester film or a polypropylene film, biaxial stretching of such a film is carried out in order to improve the dimensional stability and impact resistance thereof. However, it is very difficult to biaxially stretch a polyvinyl alcohol film in the usual manner and, therefore, a commercially successful biaxially stretched polyvinyl alcohol film has never been manufactured. That is to say, when a polyvinyl alcohol film is stretched by means of a two-stage, successive biaxial stretching method, which is generally employed in biaxial stretching of a polyester or polypropylene film, (where the film is first stretched in a machine direction and then stretched in a transverse direction by employing a tenter), the film cannot be uniformly stretched in the transverse direction and frequently breaks at the second stage, since fibrillation and crystallization of the film take place at the first stage and, therefore, the successful production of such a film has been attended with many difficulties.

In general, presently available non-stretched polyvinyl alcohol films have a tensile strength within the range of 400 to 1,200 kg./cm.$^2$ and an aleongation within the range of 100 to 300 %.

It is reported in Japanese Patent Publication No. 32959/1970 that a uniaxially oriented polyvinyl alcohol film has a tensile strength of more than 1,200 kg./cm.$^2$ and an elongation of less than 80 % along the axis of orientation. However, an industrially produced biaxially oriented polyvinyl alcohol film having such mechanical properties in each of the machine and transverse directions has never been known.

OBJECTS OF THE INVENTION

It is an object of the present invention to provide a biaxially oriented polyvinyl alcohol film having excellent tensile strength, dimensional stability, impact resistance, anti-blocking and slipability properties.

A further object of the invention is to provide a novel method for producing a biaxially stretched polyvinyl alcohol film.

A still further object of the invention is to provide a method for preparing a biaxially stretched polyvinyl alcohol film having a tensile strength of 1,200 to 3,000 kg./cm.$^2$, an elongation of 30 to 80 % and a Young's modulus of 10,000 to 30,000 kg./cm.$^2$ Another object of the invention is to provide a method for biaxially stretching a polyvinyl alcohol film by means of inflation.

These and other objects of the invention will become apparent from the description hereinafter.

BRIEF DESCRIPTION OF DRAWINGS

FIG. 1 is a schematic longitudinal section showing an embodiment of the present invention.

FIG. 2 is a cross section of the die taken on line II—II in FIG. 1.

FIG. 3 is a cross section of the dryer and polymer tubing taken on line III—III in FIG. 1.

FIG. 4 is a cross section of the pre-heater and polymer tubing taken on line IV—IV in FIG. 1.

DETAILED DESCRIPTION

It has now been found that the above-mentioned objects can be accomplished by melt-blending a mixture of polyvinyl alcohol and water, and if desired, incorporated with a polyhydric alcohol as a plasticizer, extruding the mixture in a tubular form through a circular slit, drying the extruded film under controlled conditions to give a tubular non-stretched polyvinyl alcohol film having a degree of crystallization of not more than 44 % and a water content of not more than 20 % by weight, and biaxially stretching the tubular film at a stretching ratio of not less than 2 in each of the machine and transverse directions by means of inflating the tubular film under conditions such that the film surface at the starting point of stretching is maintained at a temperature in the range from about 60° to about 150° C., the surface of the film reaching a maximum temperature in the area of the middle point of the stretching zone and the difference between the maximum and minimum temperature variation in the stretching zone being not more than about 15° C.

The value of "degree of crystallization" as shown herein means the value measured by X-ray diffraction according to the method disclosed in Ichio Sakurada et al, Kobunshi Kagaku, Vol. 12, No. 127, 483–486(1955).

In the present invention, there is no specific limitation in characteristics of polyvinyl alcohol employed as the starting material. Usually, polyvinyl alcohol having a degree of polymerization of 1,100 to 2,000 (an average molecular weight: 48,000 to 88,000) and a degree of hydrolysis of not less than 98 % by mole, preferably, not less than 99 by mole, is employed in the film forming process, to provide smooth processing of biaxial stretching, dimensional stability, toughness, anti-blocking and slipability properties.

According to the present invention, a polyvinyl alcohol film can be readily stretched in both machine and transverse directions at the same time and the resulting biaxially oriented film having excellent dimensional stability and impact resistance properties can be obtained without incorporating a plasticizer.

However, a polyhydric alcohol may be employed to make the film forming of polyvinyl alcohol easy and, therefore, a small amount of a polyhydric alcohol may be incorporated into the polyvinyl alcohol as a plasticizer. In case it is desired that the oriented film has a flexibility in addition to a dimensional stability, a polyhydric alcohol may also be incorporated in an amount of not more the 12 parts by weight, and preferably not more than 7 parts by weight, per 100 parts by weight of polyvinyl alcohol. When the amount of polyhydric alcohol is more than the above-mentioned range it is difficult to obtain an oriented film having a high tensile strength and a low elongation. Examples of the polyhydric alcohol employed in the present invention are glycerin, trimethylol propane, diethylene glycol, triethylene glycol, dipropylene glycol, and the like.

If desired, a surface active agent usually employed in combination with the plasticizer may also be incorporated.

Polyvinyl alcohol is admixed with 70 to 110 parts by weight of water per 100 parts by weight of polyvinyl alcohol, and supplied into an extruder. Such a mixture may also be pelletized and the pellets supplied into an extruder. When the amount of water is less than 70 parts by weight, polyvinyl alcohol is melted in an extruder with difficulty and tends to decompose. On the other hand, when the amount of water is more than 110 parts by weight, the film forming property of polyvinyl alcohol is lowered.

According to the present invention, the mixture of polyvinyl alcohol and water is melt-blended in an extruder and extruded in a tubular form by passing through a circular slit of a die. The extruded tubular film is dried and cooled to give a tubular non-stretched polyvinyl alcohol film which is then collapsed, for example, by a pair of nip rolls preceded by a group of collapser rolls and subsequently biaxially stretched.

The extruded tubular polyvinyl alcohol film has a thickness of 100 to 500 $\mu$ and contains about 40 to about 50 % by weight of water in the film. When such a comparatively thick film containing comparatively large amounts of water is dried by exposing only outside of the film to hot air or infrared rays, the rate of drying is slow and, moreover, the water content of the inner surface portion of the tube does not sufficiently drop and, therefore, the film blocks when collapsed and it becomes impossible to return to the original tubular form by means of gas pressure in the stretching step. To eliminate such blocking of the tubular non-stretched film, it is necessary to dry both the inside and outside of the extruded tubular film.

The present inventors have confirmed that it is necessary that the water content of the inner surface portion of the tubular, non-stretched film be less than 25 % by weight in order to substantially prevent blocking, although a slight amount blocking does not cause trouble in the stretching step. However, when the non-stretched film, having a water content on the inner surface portion of about 20 to 25 % by weight, is biaxially stretched and then collapsed again, the stretched film causes blocking, because the film becomes thinner and has a more uniform thickness than the non-stretched film and, therefore, it becomes difficult separate the film in order to, for example, transfer the film to a heat setting apparatus.

According to the present invention, it is essential that the tubular non-stretched polyvinyl alcohol film contains not more than 20 % by weight of water. There is no lower limit for the water content of the non-stretched film, but the water content can be readily controlled in practice within the range of not less than 4 % by weight. In the case of employing polyvinyl alcohol having a degree of hydrolysis of not more than 99 % by mole as the starting material, the self-adhesive property of polyvinyl alcohol per se tends to appear when the film contains a high water content. Also in the case of employing polyvinyl alcohol having a low degree of polymerization, the non-stretched film having a high water content tends to block. Accordngly, the water content of the tubular non-stretched film is preferably controlled within the range of not more than 12 % by weight. In the present invention, it is observed by the present inventors that the water content of the inner surface portion of the tubular non-stretched film is always lower than the average water content of the tubular non-stretched film.

The blocking may also be prevented by scattering an anti-blocking powder inside the tubular film without controlling the water content within the above-mentioned range. However, such a means frequently causes a trouble in printing of the end product.

On the other hand, it is well known fact that polyvinyl alcohol crystallizes by heat treatment, and the crystallization of the non-stretched film occurs also in the drying step. The higher the drying temperature, the higher the degree of crystallization. In certain cases, the degree of crystallization may reach up to near 60 %. On the other hand, even if water is removed from the film by drying it in a desiccator at room temperature or in a vacuum at room temperature, the degree of crystallization reaches usually to the extent of about 25 %, and at least to 20 %.

The crystallization of polyvinyl alcohol is based on the firm hydrogen bond. When such a crystallization proceeds to some extent in drying, the non-stretched film is biaxially stretched with difficulty. According to the present invention, the drying is controlled to provide a film having a maximum degree of crystallization of not more than 44 % and a minimum of not less than 20 % and, preferably, not less than 25 %.

To show a relation between a degree of crystallization of the non-stretched film after drying and the trouble-free operation and uniformity of the tubular biaxially stretched film, the following Table 1 is given in which the non-stretched film having a water content of 8.6 to 10.7 % by weight is biaxially stretched at a stretching ratio of 2.8 to 3.2 along each axis, and the ease of operation and the uniformity of the film are evaluated by a rupture frequency of the tubular film in the form of bubble in the stretching apparatus and a thickness deviation of the oriented film, respectively. In Table 1, polyvinyl alcohol having a degree of polymerization of 1,400 (an average molecular weight: 61,600) was employed.

Table 1

| Degree of hydrolysis of polyvinyl alcohol % by mole | Degree of crystallization of non-stretched film % | Thickness deviation of biaxially stretched film % | Rupture frequency of the bubble | Remarks |
| --- | --- | --- | --- | --- |
| 99.5 | 28 | ± 9 | extremely rare | |
| " | 32 | ±11 | extremely rare | |
| " | 34 | ±10 | extremely rare | |
| " | 38 | ±13 | rare | |
| " | 43 | ±13 | frequent to some extent | |
| " | 45 | ±24 | frequent | *1 |
| " | 48 | — | — | *2 |
| 98.3 | 26 | ±10 | extremely rare | |
| " | 28 | ± 9 | extremely rare | |
| " | 32 | ±12 | extremely rare | |
| " | 38 | ±11 | rare | |
| " | 42 | ±14 | frequent to some extent | |
| " | 46 | — | extemely frequent | *3 |

*1 The stretching is ununiform and discontinuous, and thickness deviation and uneven transparency is noticeable.
*2 The bubble ruptures at the time of starting the biaxial stretching and the operation is impossible.
*3 The stretching is ununiform and the continuous operation is considerably difficult, and uneven transparency of the film is noticeable.

As is clear from Table 1, when a non-stretched film having a degree of crystallization of more than about 44 % is stretched according to the present invention, the stretched film is considerably uneven and rupture of the bubble during the stretching step is frequent. Also, the biaxial stretching of a film having a degree of crystallization of about 48 % has been found to be impossible. Accordingly, it is clear that the degree of crystallization should be not more than 44 %.

The drying condition to control the degree of crystallization at or below 44 % varies according to the thickness of the non-stretched film, a water content prior to the drying, structure of the drying apparatus, the drying period, etc., and it is difficult to determine the exact conditions. In the present invention, however, it is important to control the surface temperature of the film below about 120° C., preferably below about 105° C. at the stage after the water content reaches about 20 % by weight.

When the water content of the non-stretched film is lowered to less than 10 % by weight, the biaxial stretching is often attended with difficulty, which results from too high a degree of crystallization as a result of being exposed at high temperatures for long period of time. Even if such a film is stored under high humidity to raise the water content, for instance, up to about 18 % by weight, smooth biaxial stretching is impossible. According to the present invention, smooth biaxial stretching is possible by controlling the stretching temperature even if the water content of the non-stretched film is low, when the drying is carried out under controlled conditions to control the crystallization.

In the present invention, the thus prepared tubular, non-stretched film is then subjected to biaxial stretching by means of inflation where the tubular non-stretched film is inflated and stretched in each of the machine and transverse directions and, at the same time, keeping a tubular form by means of heating the tube from the outside and maintaining an inner gas pressure.

As a biaxial stretching apparatus, those having a means for sealing a gas inside the tubular film located before and behind the stretching zone, a means for controlling the film speed for which the difference before and after stretching corresonds to a stretching ratio in the machine direction, a heating means located around the stretching zone and a cooling means located just behind the stretching zone are usable in the present invention.

As a means for sealing a gas, nip rolls are suitably employed and mandrels having an outer diameter corresponding to an inner diameter of the tubular film may also be applicable. As a means for controlling the film speed, nip rolls are suitably employed and an endless belt or an endless caterpillar, which moves in contact with the tubular film, may also be applicable. As a heating means, hot air or an infrared heater is suitably employed. A heating means by liquid heating medium, high frequency or micro wave may also be applicable.

The tubular non-stretched film continuously fed into such a biaxial stretching apparatus begins to stretch automatically by gas pressure, when the film is heated by a heating means and a temperature of the film reaches up to a suitable temperature. The point where the film begins to stretch is hereinafter referred to as "the stretching point". The surface temperature of the film can be correctly measured by a thermocouple of contact or non-contact type. According to the present invention, though the surface temperature of the film at the stretching point varies in accordance with the water content of the non-stretched film, the existence or amount of plasticizer, degree of crystallization, degree of hydrolysis, etc., the lower the water and plasticizer content and the higher the degree of crystallization and hydrolysis, it is more desirable that the temperature is high. Usually, the surface temperature of the film at the stretching point is suitably controlled within the range of about 60° to about 150° C. In case the temperature is lower than the above range, it is difficult to make the stretching start and forcible stretching under such conditions causes frequent rupture of the bubble, because the inner pressure rises too much. On the other hand, in case the temperature is higher than the above range, the tubular film frequently tears, since the film becomes too soft. Even if the film does not tear, the bubble sways or moves from side to side in the area of the stretching point and, therefore, not only is smooth and stable, continuous stretching difficult, but also the stretching becomes uneven and the thickness deviation of the product increases.

The tubular film which begins to stretch at a proper temperature goes on stretching by appropriate heating from the outside and reaches the maximum stretching in the transverse direction, namely the finishing point of stretching. This zone, namely the zone extending from the stretching point to the finishing point of stretching is the stretching zone. According to the present invention, it is necessary to control the temperature gradient of the film in this stretching zone in order to make smooth stretching possible.

The water content of the non-stretched film is high in comparison with the case where polyester or polypropylene is biaxially stretched, an evaporation of water occurs in the course of stretching in addition to the orientation and the crystallizaton. This water evaporation makes the film temperature drop and, therefore, it is necessary to prevent this temperature drop. Also, the drop of water content due to the evaporation of water brings about an increase of film hardness which appears as a resistance against the stretching. In order to eliminate these problems, the film temperature in the stretching zone is generally maintained at a higher temperature than the film temperature at the stretching point. That is to say, the biaxial stretching of the polyvinyl alcohol film requires a special temperature gradient which is not required in the biaxial stretching of polyester or polypropylene.

To make this necessity clear, the following Table 2 is given where films of polyvinyl alcohol having a degree of polymerization of 1,400 are smoothly and stably stretched at a stretching ratio of 3.0 to 3.2 respectively in each of the machine and transverse directions under the film temperatures regarded as the proper temperature gradient. Also in Table 2, the words A, B, C and D show the points trisecting the stretching zone which extends from the stretching point A to the finishing point D.

stretching point, the film is apt to stretch in the area of the stretching point and the tubular film bursts at this point. On the other hand, when the film temperature at the middle portion is higher than that at the other points by more than 15° C., the film is apt to stretch at the middle portion of the stretching zone, and as a result, the stretching zone becomes too short. In such a case, the expanded tubular film violently sways, and the sway brings about the increase of not only the thickness deviation of the stretched film but also the rupture of the tubular film. Accordingly, in order to proceed stably and smoothly with the biaxial stretching, it is essential that the temperature gradient is such that the difference between the maximum and the minimum temperatures of the film in the stretching zone, namely the difference between the film temperature at the middle portion and the film temperature at the finishing point, is controlled within about 15° C.

In order to manufacture film having excellent tensile strength and dimensional stability, it is necessary to increase the degree of molecular orientation to a high level during the biaxial stretching step. For that purpose, the film is stretched not less than two times in each of the machine and transverse directions in the present invention.

The other important factor for effectively increasing the degree of molecular orientation in addition to the stretching ratio is the stretching temperature. In the case of biaxially stretching the tubular film in accordance with the present invention, the film temperature in the stretching zone cannot be freely changed. As mentioned before, for the purpose of providing ease of operation and obtaining stability of stretching and film Table 2

| Degree of hydrolysis of polyvinyl alcohol % by mole | Degree of crystallization of non-stretched film % | Average water content of non-stretched film % by weight | Glycerin content of non-stretched film % by weight | Surface temperature of film °C. | | | | Difference between maximum and minimum temperatures °C. |
|---|---|---|---|---|---|---|---|---|
| | | | | A | B | C | D | |
| 99.5 | 28 – 34 | 20.2 | 0 | 61 | 64 | 62 | 57 | 7 |
| " | " | 15.8 | 0 | 74 | 76 | 73 | 68 | 8 |
| " | " | 11.3 | 0 | 88 | 92 | 93 | 83 | 10 |
| " | " | 8.5 | 0 | 97 | 104 | 106 | 96 | 10 |
| " | 36 – 40 | 13.8 | 0 | 90 | 96 | 94 | 87 | 9 |
| " | " | 11.1 | 0 | 98 | 107 | 106 | 98 | 9 |
| " | " | 7.8 | 0 | 122 | 131 | 133 | 121 | 12 |
| 99.5 | 30 – 34 | 10.6 | 6.0 | 78 | 82 | 81 | 70 | 12 |
| " | " | 7.0 | 6.0 | 87 | 91 | 89 | 78 | 13 |
| " | " | 4.4 | 6.0 | 116 | 120 | 117 | 106 | 14 |
| " | 35 – 38 | 12.2 | 6.0 | 81 | 87 | 85 | 79 | 8 |
| " | " | 7.3 | 6.0 | 99 | 105 | 101 | 92 | 13 |
| " | " | 4.1 | 6.0 | 128 | 134 | 128 | 119 | 15 |
| " | " | 3.4 | 6.0 | 142 | 148 | 140 | 133 | 15 |
| 98.3 | 26 – 32 | 16.2 | 0 | 67 | 70 | 70 | 64 | 6 |
| " | " | 12.4 | 0 | 78 | 80 | 82 | 73 | 9 |
| " | " | 9.3 | 0 | 85 | 89 | 91 | 82 | 9 |
| " | 34 – 38 | 14.7 | 0 | 69 | 72 | 70 | 64 | 8 |
| " | " | 11.6 | 0 | 80 | 83 | 82 | 73 | 10 |
| " | " | 8.7 | 0 | 86 | 91 | 91 | 80 | 11 |

This proper temperature gradient is not straight, and is characterized by the fact that the film temperature at the middle portion of the stretching zone is higher than the film temperatures at both stretching and finishing points. The film temperature at the finishing point is slightly lower than the temperature of the film at the stretching point. The difference between the maximum and the minimum temperatures in the stretching zone is not more than about 15° C. When this proper temperature gradient changes sharply, various troubles occur. For instance, when the film temperature at the middle portion of the stretching zone is lower than that at the uniformity, namely for the purpose of minimizing the sway of the bubble and preventing the rupture of the bubble, the stretching temperature is maintained within a comparatively narrow range in practical operation and, therefore, it has been found that the proper degree of molecular orientation can actually only be determined by the stretching ratio. If the stretching of the film is insufficient, printed, adjacent colors apt to appear out of register during the printing process since such a film unnecessarily elongates by a comparatively low tension, and also such film is easily creased in printing and bag making, since the film is not hard enough.

The quality of the film necessary in uses such as printing and bag making can be generally estimated by Young's modulus and tensile elongation of the film. For example, the higher the Young's modulus and the lower the tensile elongation, the better the quality of the film. The impact resistance, (especially at a low temperature), of the produced film also drops if the stretching of the film is insufficient. In particular, when the film does not include a polyhydric alcohol as a plasticizer, the film not stretched sufficiently shows a low impact strength at low temperature. Accordingly, the biaxial stretching must be effected at a sufficient stretching ratio.

To show a relation between the stretching ratio and physical properties of the films of polyvinyl alcohol having a degree of polymerization of 1,400, the following Table 3 is given in which the terms "MD" and "TD" mean the "machine direction" and the "transverse direction", respectively. Films heat-set at a temperature of 180° to 200° C. for 3 minutes after the biaxial stretching were subjected to the measurement for physical properties. Tensile strength, elongation and Young's modulus were measured at a temperature of 20° C. and at a relative humidity of 65 % according to the provision of ASTM D 882, and impact strength was measured at a temperature of 5° C. and at a relative humidity of 65 % by a film impact tester made by Tohyo Seiki Co., Ltd. and employing a dart of ½ inch in diameter.

In case of evaluating the data in each physical property from a viewpoint of a wrapping film, it is usually suitable that the tensile strength be as high as possible, the elongation is within about 100 to about 30 %, preferably about 80 to about 30 % and the Young's modulus is more than 10,000 kg./cm².

In studying the data in Table 3 from the above viewpoint, it is clear that the stretching ratio should be at least 2, and preferably more than 2.5, in each of the machine and transverse directions. However, the stretching ratio of more than 4.5 is not quite desirable because the film thickness is controlled with difficulty.

According to the present invention, the film having a tensile strength of 1,200 to 3,000 kg./cm²., particularly 1,200 to 2,500 kg/cm²., an elongation of 30 to 80 % and a Young's modulus of 10,000 to 30,000 kg./cm²., particularly 10,000 to 20,000 kg./cm²., can be readily obtained In the present invention, the film can be biaxially stretched not only at the same stretching ratio in each of the machine and transverse directions as shown in Table 2 but also at the different stretching ratios by controlling the stretching ratio in the machine direction and the stretching ratio in the transverse direction independently to give a polyvinyl alcohol film of which the characteristics in the machine direction are different from those in the transverse direction.

The film so prepared by biaxially stretching and keeping the tubular form is then subjected to heat-setting under known conditions, as occasion demands, to remove inner distortion and to complete the crystallization.

Table 3

| Degree of hydrolysis of polyvinyl alcohol % by mole | Non-stretched film | | | Surface temperature of film at stretching point °C. | Stretching ratio | |
|---|---|---|---|---|---|---|
| | Glycerin content % by weight | Degree of crystallization % | Average water content % by weight | | MD | TD |
| 99.5 | 0 | — | 8.3 | 95 | 1.75 | 1.75 |
| | 0 | 30 | 8.7 | 96 | 2.0 | 2.1 |
| | 0 | — | 8.5 | 97 | 2.5 | 2.6 |
| | 0 | 34 | 8.5 | 97 | 3.0 | 3.2 |
| | 0 | — | 9.4 | 97 | 3.5 | 3.6 |
| | 0 | 34 | 10.1 | 94 | 4.0 | 4.3 |
| | 6.0 | — | 6.7 | 84 | 2.0 | 2.0 |
| | 6.0 | — | 6.3 | 85 | 2.5 | 2.6 |
| | 6.0 | 32 | 7.0 | 87 | 3.0 | 3.1 |
| | 6.0 | 34 | 7.6 | 87 | 3.5 | 3.6 |
| 98.3 | 0 | — | 8.9 | 82 | 1.75 | 1.75 |
| | 0 | 30 | 9.1 | 84 | 2.0 | 2.0 |
| | 0 | — | 9.5 | 82 | 2.5 | 2.7 |
| | 0 | 28 | 9.3 | 85 | 3.0 | 3.1 |
| | 0 | — | 10.6 | 87 | 3.5 | 3.6 |
| | 0 | 32 | 11.4 | 83 | 4.0 | 4.2 |

| Thickness of oriented film μ | Physical property | | | | | | |
|---|---|---|---|---|---|---|---|
| | Tensile strength kg./cm².| | Elongation % | | Young's modulus kg./cm². | | Impact strength kg.-cm. |
| | MD | TD | MD | TD | MD | TD | |
| 22.5 | 1080 | 1010 | 108 | 92 | 7900 | 8400 | 4.2 |
| 21.1 | 1340 | 1330 | 77 | 70 | 10500 | 11200 | 6.6 |
| 19.8 | 1600 | 1660 | 64 | 58 | 12200 | 14700 | 6.3 |
| 20.4 | 1780 | 1890 | 55 | 47 | 13100 | 15800 | 6.0 |
| 19.3 | 2050 | 2060 | 44 | 39 | 15300 | 17600 | 7.2 |
| 18.7 | 2170 | 2240 | 36 | 34 | 16800 | 18800 | 6.6 |
| 22.2 | 1260 | 1270 | 80 | 73 | 8600 | 9300 | 7.0 |
| 20.8 | 1590 | 1600 | 71 | 65 | 10400 | 11800 | 7.3 |
| 20.6 | 1780 | 1810 | 58 | 46 | 11000 | 12700 | 7.8 |
| 18.9 | 1940 | 2020 | 48 | 37 | 12500 | 14200 | 7.8 |
| 23.0 | 1090 | 940 | 93 | 88 | 6800 | 8100 | 4.9 |
| 21.7 | 1280 | 1210 | 68 | 64 | 9800 | 10600 | 6.1 |
| 20.3 | 1470 | 1610 | 59 | 51 | 10900 | 12300 | 6.9 |
| 19.4 | 1800 | 1860 | 50 | 39 | 11700 | 12800 | 7.2 |
| 18.1 | 1880 | 1930 | 43 | 37 | 13400 | 14000 | 6.8 |
| 17.9 | 1920 | 1970 | 35 | 28 | 14100 | 16600 | 6.3 |

An embodiment of the present invention will be explained particularly with reference to the accompanying drawings.

Referring now to the drawings, and particularly to FIG. 1, a mixture of polyvinyl alcohol and water, to which a polyhydric alcohol and a surface active agent are added, if desired, is supplied into an extruder 1 equipped with a ring die 2 and melt-blended with heating. The mixture being melted uniformly is extruded through a circular slit 3 of the die 2 in tubular form. FIG. 2 shows a cross section of the die taken on line II—II in FIG. 1. The extruded tubular film 4 is then dried in a cylindrical dryer 5 located under the die 2 by hot air of which temperature is controlled. FIG. 3 shows a cross section of the dryer and polymer tubing taken on line III—III in FIG. 1. The tubular film 4 is forcibly dried from the outside by hot air injected from a multi-hole plate 6 inside of the dryer 5 to the outer surface of the film, and simultaneously dried also from the inside by hot air blown into the inside of the tubular film through an airpipe 7 which passes through the center of the die 2. The hot air blown into the inside through the airpipe 7 is discharged into the outside of the die through an opening 8 between a cylindrical bore made at the center of the die 2 and the airpipe 7.

The tubular film passing through the lower end of the dryer 5 is immediately cooled by cooling air injected from a cooling air ring 9 to the film, and then collapsed by a group of collapser rolls 10 and a pair of nip rolls 11.

The water content and the degree of crystallization of the tubular film, especially the water content and the degree of crystallization of the inner surface portion of the film, are controlled by controlling the temperature and velocity of the hot air injected to both sides of the tubular film and the film speed.

The collapsed, tubular, non-stretched film is then biaxially stretched. The non-stretched film is fed to low-speed nip rolls 12 located at the top of the stretching apparatus and led to high-speed nip rolls 20 located at the bottom of the stretching apparatus. The stretching ratio in the machine direction is determined by controlling the ratio of the peripheral speed of the high-speed nip rolls 20 to that of the low-speed nip rolls 12.

The non-stretched film fed into the stretching apparatus through the low-speed nip rolls 12 is pre-heated in a pre-heater 13 by hot air, (the temperature of which is controlled), injected from a multi-hole plate 14 inside of the pre-heater 13. FIG. 4 shows a cross section of the pre-heater and polymer tubing taken on line IV—IV in FIG. 1. The pre-heated film is then heated by hot air, (the temperature of which is controlled), injected from an upper air ring 16 and a lower air ring 17. The hot film is inflated by pressurized air blown into the tubular film through an opening of the high-speed nip rolls 20, in addition to being cooled by cooling air injected from a cooling air ring 18. The high-speed nip rolls 20 are closed together immediately after blowing pressurized air into the tubular film at the time of beginning of the operation, by which the leak of air is prevented.

A baffle 15 made from an elastic material is set up at the lower end of the pre-heater 13 to prevent the blowing downward of hot air from the pre-heater 13 which may drop the temperature of the hot air from the upper air ring 16, or to prevent the blowing into the pre-heater 13 of the hot air from the upper air ring 16.

Usually, the temperature of the hot air from the pre-heater is kept lower than the temperature of the film at the stretching point by 20° to 30° C. to prevent the expansion of the tubular film in the pre-heater 13. The drying of the non-stretched film is minimal in the pre-heater 13, because the temperature of pre-heating is relatively low and the transit time of the film is short.

The temperature of the hot air injected from the upper air ring 16 is higher than the temperature of the film at the stretching point, and the hot air is injected to the stretching point A. The hot air from the lower air ring 17 is injected below the stretching point A at a temperature higher than the temperature of the hot air from the upper air ring 16 by "0° to about 15° C." The point where the hot air from the ring 17 is injected against the tube surface about ⅓ to ½ the length of the stretching zone beginning from the stretching point.

The cooling air from the cooling air ring 18 is injected upward at an angle to a point a short distance below the finishing point D.

By controlling the temperature, initial velocities and the injection point of the hot air from both air rings 16 and 17 and the initial velocity and injection point of the cooling air from the cooling air ring 18, the surface temperature of the film in the stretching zone from A to D can be controlled to show the appropriate temperature gradient.

The stretching ratio in the transverse direction is determined by the ratio of the diameter of the stretched film at the finishing point to that of the non-stretched film at the inlet of the pre-heater.

After biaxially stretching the tubular film and cooling the stretched film, the tubular film is collapsed by a group of collapser rolls 19 and the high-speed nip rolls 20 and leaves the stretching apparatus. The collapsed film is made again to tubular form and transferred into a cylindrical heat-setting apparatus, which is not shown in the drawing, while keeping the tubular form, or both edges of the collapsed film are cut open to give two sheets and transferred into a heat-setting apparatus of a parallel tenter-type or a heat-roll type which is not shown in the drawing. The heat-set film is then rolled up.

The biaxially oriented polyvinyl alcohol film prepared in accordance with the present invention has excellent physical properties such as tensile strength, elongation, Young's modulus and impact strength, and of which dimensional stability and impact resistance are remarkably improved as compared with a commercially available non-stretched polyvinyl alcohol film. Especially, the oriented polyvinyl alcohol film of the present invention is characterized by having a tensile strength of not less than 1,200 kg./cm.$^2$, an elongation of not more than 80 % and a Young's modulus of not less than 10,000 kg./cm.$^2$, which are measured at a temperature of 20°C. and at a relative humidity of 65 % in accordance with the provision of ASTM D 882.

As explained above, the present method can provide the biaxially oriented film, to advantage in industry, excellent in mechanical properties, dimensional stability, anti-static and anti-fogging properties and suitable for subjecting to secondary processing.

The present invention is more specifically described and explained by means of the following Examples, in which all parts are parts by weight.

EXAMPLE 1

Water was added to dried powders of polyvinyl alcohol having an average degree of polymerization of about 1,400 (an average molecular weight: 61,600) and a degree of hydrolysis of 99.5 % by mole in an amount of 85 parts per 100 parts of the powders, and uniformly admixed. The mixture was then supplied to an extruder, melt-blended with heating and extruded downward at a temperature of 96° C. through a circular slit of 100 mm. in diameter of a ring die as shown in the drawings.

This non-dried tubular film containing about 45 % by weight of water was successively led to a cylindrical dryer as shown in the drawings, and both inner and outer surfaces of the tubular film were dried by blowing hot air at a temperature of 108° C. to the outside of the film from an inside of the dryer and simultaneously by contacting the inside of the film with a hot air flow supplied and discharged through passages in the ring die. The dried film was then cooled by means of a cooling air ring, and collapsed by a pair of nip rolls. A diameter of the thus prepared non-stretched tubular film was 110 mm., and the degree of crystallization was 34 %. Further, the average water content of the film was 8.5 % by weight and the water content of the inner surface portion of the film was 6.8 % by weight. When the film was collapsed, there was no blocking of the film.

The average water content was calculated from the difference between weights of a sample film before and after drying at a temperature of 100° C. for about 4 to about 5 hours under vacuum. The measurement of the water content of the inner surface portion was effected by cutting off an inner surface portion of the film to about 20 micron thick by a microtone and measuring the water content thereof by the Karl-Fisher method.

The non-stretched film was then transferred to a biaxial stretching apparatus, and simultaneously biaxially stretched. Low-speed nip rolls and high-speed nip rolls were controlled at a peripheral speed of 5.0 m./min. and 15.0 m./min., respectively.

From an inside of a cylindrical pre-heater, hot air at a temperature of 70° C. was blown. From a slit of an upper air ring, hot air at a temperature of 107°C. was blown to the film surface at the stretching point at an angle of 45° to the film and at an initial velocity of 23 m./sec., and also from a slit of a lower air ring, hot air at a temperature of 115° C. was blown to the film surface at a distance of 160 mm. from the stretching point in a vertical direction at an angle of 45° to the film and at an initial velocity of 21 m./sec. Further, from a slit of a cooling air ring, air at room temperature was simultaneously blown to the film surface at a distance of about 200 mm. downward from the finishing point at an angle of 20° to a gravitational direction and at an initial velocity of 10 m./sec. Under such conditions, the biaxial stretching was most smoothly and stably carried out. There was no sway of the bubble in the stretching zone and the stretching was continued for a long period of time without the rupture of the bubble.

the surface temperature at the points A, B, C and D trisecting the stretching zone which extended from the stretching point A to the finishing point D were 97° C., 104° C., 106° C., and 96° C., respectively. Thus, the film temperature at the middle portion of the stretching zone is higher than those at both stretching and finishing points. The difference between the maximum and minimum temperatures in the stretching zone was 10° C.

The diameter of the bubble after the expansion reached to maximum was 350 mm. and, therefore, the stretching ratio in the transverse direction was about 3.2. On the other hand, the stretching ratio in the machine direction was 3 which was calculated from the ratio of the peripheral speed of the high-speed nip rolls to that of the low-speed nip rolls.

Thus stretched tubular film was then gradually collapsed by a group of collapser rolls and taken out of the apparatus through the high-speed nip rolls. There was no blocking of the tubular film when collapsed, and it was possible easily to cut open or separate to two sheets.

Both edges of this collapsed tubular film were then cut to give two flat sheets, and each sheet was heat-set for 3 minutes by contacting it with a rotational heat roll of which surface temperature was kept at 200° C. The sheet was then cooled and rolled up.

The results of the measurement of physical properties were shown in Table 4.

As a control, physical properties of a nonstretched polyvinyl alcohol film (commercially available under the trademark "VINYLON TUBE" made by The Nippon Synthetic Chemical Industry Co., Ltd.) including about 10 % by weight of glycerin were measured. The results thereof were also shown in Table 4.

Table 4

|  | Example 1 | Control |
|---|---|---|
| Thickness ($\mu$) | 20.4 | 30.0 |
| Haze (%) | 1.5 | 1.5 |
| Tensile strength (kg./cm.$^2$) | | |
| MD | 1,780 | 550 |
| TD | 1,890 | 420 |
| Elongation (%) | | |
| MD | 55 | 250 |
| TD | 47 | 270 |
| Young's modulus (kg./cm.$^2$) | | |
| MD | 13,100 | 2,300 |
| TD | 15,800 | 2,000 |
| Impact strength at 5°C. (kg.-cm.) | 6.0 | — |

Note:
The term "haze" shows the value measured in accordance with ASTM D 1003-61.

As is clear from Table 4, the tensile strength and Young's modulus of the film was remarkably increased, and the elongation reached an appropriate value, near 50 % from which it was understood that the dimensional stability was remarkably improved. Also, the impact strength at low temperature reached high value sufficient for practical use despite that the film was not plasticized by such a plasticizer as glycerin.

EXAMPLE 2

Glycerin and water was added to dried powders of polyvinyl alcohol having an average degree of polymerization of about 1,400 and a degree of hydrolysis of 99.5 % by mole in an amount of 12 parts and 73 parts, respectively per 100 parts of the powder, and uniformly admixed. The mixture was extruded to give a tubular film in the same manner as in Example 1.

The temperature of the hot air injected from the inside of the cylindrical dryer to the outer surface of the film was 105° C. and the temperature of the hot air flow in the tubular film was 82° C.

The diameter of the dried non-stretched film was 110 mm. and the degree of crystallization was 32 %. The dried film contained 6.0 % by weight of glycerin and also contained 7.0 % by weight of water on the average. The water content of the inner surface portion of the film was 6.2 % by weight, but there was no blocking which might cause troubles in stretching procedure.

This dried non-stretched film was then fed into the stretching apparatus and biaxially stretched in the same manner as in Example 1. The most stable, smooth and uniform stretching was carried out when the temperatures of the hot air from the pre-heater, the upper air ring and the lower air ring were 63° C., 98° C. and 100° C., respectively. At that time, the surface temperatures of the film at the points A, B, C and D in the stretching zone were 87° C., 91° C., 89° C. and 78° C., respectively. The difference between the maximum and minimum temperatures of the film in the stretching zone was 13° C. The stretching ratios in the machine direction and the transverse direction were 3.0 and 3.1, respectively which were calculated from the ratio of peripheral speeds of low-speed and high-speed nip rolls and the ratio of tube diameters before and after the stretching.

The biaxially stretched film collapsed through the high-speed nip rolls did not show any blocking which might cause troubles, and easily separated to two sheets by cutting both film edges. The sheet was heat-set for 3 minutes by contacting it with the rotational heat roll of which surface temperature was kept at 180° C., and physical properties thereof were measured.

The results were shown in Table 5.

Table 5

|  | Example 2 |
| --- | --- |
| Thickness ($\mu$) | 20.6 |
| Haze (%) | 1.6 |
| Tensile strength (kg./cm.$^2$) |  |
| MD | 1,780 |
| TD | 1,810 |
| Elongation (%) |  |
| MD | 58 |
| TD | 46 |
| Young's modulus (kg./cm.$^2$) |  |
| MD | 11,000 |
| TD | 12,700 |
| Impact strength at 5°C. (kg.-cm.) | 7.8 |

EXAMPLE 3

Water was added to dried powders of polyvinyl alcohol having an average degree of polymerization of about 1,700 (an average molecular weight: 74,800) and a degree of hydrolysis of 98.3 % by mole in an amount of 95 parts per 100 parts of the powder, and uniformly admixed. The mixture was then melt-blended by an extruder for pelletizing, extruded through a multi-hole die of the extruder and cut after cooling to give polyvinyl alcohol pellets including water of which content was 46 % by weight.

The thus prepared pellets were extruded in a tubular form and dried in the cylindrical dryer in the same manner as in Example 1. The temperature of the outside and the inside hot airs were 112° C. and 86° C., respectively.

The diameter of the dried non-stretched film was 102 mm. and the degree of crystallization was 32 %. The average water content of the dried film was 11.4 % by weight and the water content of the inner surface portion thereof was 8.7 % by weight, but there was no blocking which might cause troubles in stretching procedures.

This dried non-stretched film was then fed into the stretching apparatus and biaxially stretched in the same manner as in Example 1. The peripheral speeds of the low-speed and high-speed nip rolls were 3.0 m./min. and 12.0 m./min., respectively and the diameters of tubular film before and after the stretching were 102 mm. and 430 mm., respectively. That is to say, the stretching ratio in the machine direction was 4.0 and that in the transverse direction was 4.2.

The most stable, smooth and uniform stretching was carried out when the temperatures of the hot air from the pre-heater, the upper air ring and the lower air ring were controlled at 60° C., 96° C. and 101° C., respectively and the initial velocity of the cooling air injected from the cooling air ring was controlled at 8 m./sec. Under such conditions, the stretching was continued for a long period of time without the sway and the rupture of the bubble. At that time, the surface temperatures of the film at the points A, B, C and D in the stretching zone were 83° C., 92° C., 93° C. and 82° C., respectively. The difference between the maximum and minimum temperatures of the film in the stretching zone was 11° C.

The biaxially stretched film collapsed through the high-speed nip rolls did not show any blocking which might cause troubles in transferring the film to the heatsetting step.

The physical properties of the film subjected to the heat-setting in the same manner as in Example 2 were shown in Table 6 which showed that the tensile strength and Young's modulus were more increased and also the elongation is more decreased as compared with those in Examples 1 and 2 since the stretching ratio is higher than those in Examples 1 and 2. The decrease of elongation showed that the dimensional stability of the film was more highly improved.

Table 6

|  | Example 3 |
| --- | --- |
| Thickness ($\mu$) | 17.9 |
| Haze (%) | 1.5 |
| Tensile strength (kg./cm.$^2$) |  |
| MD | 1,920 |
| TD | 1,970 |
| Elongation (%) |  |
| MD | 35 |
| TD | 28 |
| Young's modulus (kg./cm.$^2$) |  |
| MD | 14,100 |
| TD | 16,600 |
| Impact strength at 5°C. (kg.-cm.) | 6.3 |

EXAMPLE 4

The same mixture of polyvinyl alcohol and water as Example 1 was prepared and supplied to an extruder of 90 mm. The mixture was then melt-blended and extruded through a circular slit of 300 mm. in diameter of a ring die in tubular form.

The extruded tubular film was then led to a large-sized cylindrical dryer and dried from both outside and inside. The temperatures of the hot air injected to the outer surface and the inner surface of the tubular film were 118° and 98° C., respectively. The diameter of the dried non-stretched film was 350 mm. and the degree of crystallization was 38 %. The average water content of the dried film was 13.4 % by weight and the water content of the inner surface portion thereof was 11.2 % by weight, but there was no blocking which might cause troubles in stretching procedures.

This dried non-stretched film was then fed into a large-sized stretching apparatus of which structure was similar to the stretching apparatus shown in the drawings, and biaxially stretched in the same manner as in Example 1. The stretching ratios were 2.8 in the machine direction and 3.1 in the transverse direction, which were calculated from the ratio of peripheral speeds of low-speed and high-speed nip rolls and the ratio of tube diameter before and after the stretching.

The most stable, smooth and uniform stretching was carried out when the temperatures of the hot air from a pre-heater, an upper air ring and lower air ring were controlled at 67° C., 108° C. and 108° C., respectively, and the air from the upper and lower air rings and an cooling air ring were injected to the film at an initial velocity of 28 m./sec., 34 m./sec., and 13 m./sec., respectively at the same angle to the film as in Example 1. Under such conditions, the stretching was continued for a long period of time without the sway and the rupture of the bubble. At that time, the surface temperatures of the film at the points A, B, C and D in the stretching zone were 94° C., 98° C., 94° C. and 87° C., respectively. The difference between the maximum and minimum temperatures of the film in the stretching zone was 11° C.

The biaxially stretched film leaving the stretching apparatus through high-speed nip rolls had a thickness of about 20 μ and a width of the collapsed tubular film was about 1,700 mm. The collapsed film did not show any blocking which might cause troubles in transferring the film to the heat-setting step.

The film was heat-set by a large-sized heat roll in the same manner as in Example 1 and physical properties were measured. The results were shown in Table 7.

It is clear from Table 7 that the dimensional stability is remarkably improved.

Table 7

|  | Example 4 |
|---|---|
| Thickness (μ) | 19.7 |
| Haze (%) | 1.6 |
| Tensile strength (kg./cm.²) |  |
| MD | 1,630 |
| TD | 1,870 |
| Elongation (%) |  |
| MD | 61 |
| TD | 50 |
| Young's modulus (kg./cm.²) |  |
| MD | 12,600 |
| TD | 14,900 |
| Impact strength at 5°C. (kg.-cm.) | 6.2 |

What we claim is:

1. A method for preparing polyvinyl alcohol film which comprises
    1. melt-blending a mixture comprising polyvinyl alcohol having a degree of polymerization of 1,100 to 2,000 and a degree of hydrolysis of not less than 98% by mole and 70 to 110 parts by weight of water per 100 parts by weight of said polyvinyl alcohol in an extruder,
    2. extruding the melted mixture through a circular slit of a die in tubular form.
    3. drying the extruded tubular film from both the inside and outside to provide a non-stretched film having a degree of crystallization of from 20% to 44% and a water content of not more than 20% by weight.
    4. collapsing the tubular, non-stretched film,
    5. heating and inflating the collapsed, non-stretched film to obtain a biaxially oriented film, said film being stretched at a ratio of not less than 2 in each of the machine and transverse directions, whereby the heating provides a temperature of the film at a starting point of stretching in a range from about 60° C to about 150° C and a maximum temperature in the middle portion of a stretching zone extending from the starting point to a point where the inflated tube reaches a maximum diameter, the difference between the maximum and minimum temperatures in the stretching zone being not more than 15° C, and
    6. recovering the resulting biaxially oriented film.

2. The method of claim 1, in which said mixture contains at least one polyhydric alcohol selected from the group consisting of glycerin, trimethylol propane, diethylene glycol, triethylene glycol and dipropylene glycol in an amount of not more than 12 parts by weight per 100 parts by weight of said polyvinyl alcohol.

3. The method of claim 3, wherein the amount of said polyhydric alcohol is not more than 7 parts by weight per 100 parts by weight of said polyvinyl alcohol.

4. The method of claim 1 wherein said nonstretched film has a degree of crystallization of 20 to 44 % and a water content of 4 to 20 % by weight, and is stretched at a stretching ratio of 2 to 4.5 in each of the machine and transverse directions.

5. The method of claim 4, wherein said degree of crystallization is within the range of 25 to 44 % and said water content is within the range of 4 to 12 % by weight.

6. The method of claim 4, wherein said stretching ratio in each of the machine and transverse directions is within the range of 2.5 to 4.5.

\* \* \* \* \*